United States Patent
Zhang et al.

(10) Patent No.: US 8,932,998 B2
(45) Date of Patent: Jan. 13, 2015

(54) METHODS FOR CROSSLINKING WATER SOLUBLE POLYMERS FOR USE IN WELL APPLICATIONS

(75) Inventors: Jinguo Zhang, Katy, TX (US); Paul H. Javora, Spring, TX (US); Keith W. Sharp, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 1280 days.

(21) Appl. No.: 12/573,544

(22) Filed: Oct. 5, 2009

(65) Prior Publication Data

US 2011/0082057 A1 Apr. 7, 2011

(51) Int. Cl.
*C09K 8/52* (2006.01)
*C09K 8/62* (2006.01)
*C09K 8/10* (2006.01)
*C09K 8/08* (2006.01)
*C09K 8/514* (2006.01)
*C09K 8/512* (2006.01)
*C09K 8/588* (2006.01)
*C09K 8/68* (2006.01)
*C09K 8/88* (2006.01)
*C09K 8/90* (2006.01)

(52) U.S. Cl.
CPC .............. *C09K 8/514* (2013.01); *C09K 8/512* (2013.01); *C09K 8/588* (2013.01); *C09K 8/685* (2013.01); *C09K 8/887* (2013.01); *C09K 8/90* (2013.01)
USPC ........... 507/219; 507/211; 507/214; 507/216; 507/217; 507/235; 507/248; 507/269; 507/271; 166/305.1

(58) Field of Classification Search
None
See application file for complete search history.

(56) References Cited

U.S. PATENT DOCUMENTS

| | | | |
|---|---|---|---|
| 3,522,844 A * | 8/1970 | Abdo .......................... 166/270 |
| 3,974,077 A | 8/1976 | Free | |
| 4,566,976 A * | 1/1986 | House et al. .................. 507/114 |
| 4,594,170 A * | 6/1986 | Brown et al. ................. 507/277 |
| 4,683,954 A * | 8/1987 | Walker et al. ................ 166/307 |
| 4,784,694 A | 11/1988 | Lemanczyk | |
| 5,055,209 A * | 10/1991 | Bridges et al. ............... 507/110 |
| 5,226,481 A * | 7/1993 | Le et al. ....................... 166/300 |
| 5,263,540 A * | 11/1993 | Dovan et al. ................. 166/278 |
| 5,363,916 A * | 11/1994 | Himes et al. ................. 166/276 |
| 5,762,140 A * | 6/1998 | Hardy et al. .................. 166/295 |
| 6,987,083 B2 | 1/2006 | Phillippi et al. | |
| 2001/0047868 A1* | 12/2001 | Morris et al. ................. 166/312 |
| 2003/0029616 A1 | 2/2003 | Maberry | |
| 2004/0122112 A1* | 6/2004 | Griese et al. .................... 516/43 |
| 2007/0049501 A1* | 3/2007 | Saini et al. .................... 507/260 |
| 2008/0026958 A1* | 1/2008 | Todd et al. .................... 507/214 |
| 2008/0108522 A1 | 5/2008 | Carman | |
| 2008/0176770 A1* | 7/2008 | Sanders et al. ............... 507/213 |
| 2008/0226724 A1* | 9/2008 | Ji et al. .......................... 424/486 |

OTHER PUBLICATIONS

International Search Report and Written Opinion dated Nov. 30, 2010 issued in corresponding PCT Application No. PCT/US2010/050555.
Office Action dated Mar. 28, 2013 issued in Canadian Patent Application No. 2,775,515.

* cited by examiner

*Primary Examiner* — John J Figueroa
(74) *Attorney, Agent, or Firm* — Parsons Behle & Latimer

(57) ABSTRACT

A method for forming a well and pipeline treating fluid is provided. The method comprises combining a cross-linkable gelling polymer, a scavenging compound capable of reducing a concentration of divalent and polyvalent metal ions and salts thereof available for reaction, a hydration solvent and optionally an acid. The resulting mixture has a pH ranging from about 3 to about 7 and a first viscosity. The mixture is maintained at conditions suitable for hydration of the cross-linkable gelling polymer until the mixture has a second viscosity that is greater than the first viscosity. The mixture is combined with an aqueous based fluid and at least one cross-linking agent. The pH of the mixture is raised to a sufficient level to allow a desired degree of cross-linking to occur. Other methods, a well and pipeline treating gel and a well and pipeline treating fluid are also provided.

50 Claims, No Drawings

METHODS FOR CROSSLINKING WATER SOLUBLE POLYMERS FOR USE IN WELL APPLICATIONS

BACKGROUND

1. Field of the Disclosure

The present invention relates to methods for making and using well and pipeline treating fluids, and more specifically, to methods for hydrating and cross-linking water soluble polymers for use as well and pipeline treating fluids and the compositions resulting from these methods.

2. Description of the Related Art

The present application is directed to, among other things, methods for making and using fluids for treating wells and pipelines. For purposes of this application, a "well treating fluid" is a fluid used in a subterranean application, and "pipeline treating fluid" is a fluid used in a pipeline application. The term "treating" herein does not imply any particular action by the fluid or any component thereof. Examples of well treating fluids include fluid loss control compositions, hole-plugging compositions, displacement fluids, fracturing fluids and insulating fluids. Examples of pipeline treating fluids include a viscous pigging fluid and pipeline insulating fluids.

Providing effective fluid-loss control for well treating fluids is highly desirable. Fluid-loss control materials are additives specifically designed to lower the volume of a filtrate that passes through a filter medium. Most attain their fluid-loss control from the presence of solvent-specific solids, or from polymers that rely on filter cake buildup, or from polymers that rely on viscosity or viscoelasticity to inhibit flow into and through the formation. A variety of fluid-loss control materials have been used and evaluated, including foams, oil-soluble resins, acid-soluble particulates, graded salt slurries, linear polymers, viscoelastic fluid systems, and crosslinked polymers. Their respective comparative effects are well documented.

U.S. Patent Publication No. 2008/0026958 describes a variety of techniques that have been developed to control fluid loss. These include the use of "fluid-loss control pills," which sometimes are referred to as "lost circulation pills." Through a combination of viscosity, solids bridging, and cake buildup on the porous rock, these pills oftentimes are able to substantially seal off portions of the formation from fluid loss. They can also potentially enhance filter-cake buildup on the face of the formation to inhibit fluid flow into the formation from the wellbore.

Hole plugging fluids are also well known in the art. Sometimes in subterranean wells a hole can develop between the annulus and the production tubing. This can result in unwanted leakage of production fluid and/or fluids intended to flow through the production tubing into, for example, the packer annulus, and/or the unexpected leakage of the packer fluid or other fluids in the annulus into the production tubing. A solution to the problem is to place a hole-plugging material downhole across the hole or zone of fluid loss. The hole-plugging material is either formulated to be pre-cross-linked or to cross-link at downhole temperatures to seal the leak(s).

Another type of well treating fluid is known as an insulating fluid for an oil and/or gas well or pipeline. U.S. Pat. No. 6,908,886 provides examples of insulating fluids that are known in the art. Insulating fluids can have low thermal conductivities, while simultaneously meeting other constraints (e.g., regulatory or environmental constraints). These fluids can be facile to pump, yet can be capable of becoming more viscous after they are resident in situ within the annular space or one of the annular spaces in an oil and/or gas well, or pipeline.

A number of cross-linkable polymers are known for use in well treating fluids. These polymers can include hydratable polysaccharides, such as, for example, celluloses, which include derivatives of cellulose as described herein; and guars, which include guar and guar derivatives, such as carboxymethyl hydroxypropyl guar. A commonly used crosslinkable polymer for fluid-loss control pills are graft copolymers of a hydroxyalkyl cellulose that are prepared by a redox or redox initiated free-radical reaction with vinyl phosphonic acid. One example of this cross-linkable gelling polymer is known as SPECIAL PLUG, which is available from the Special Products Division of Champion Technologies, Inc., located in Houston, Tex.

A gel is formed by hydrating cross-linkable copolymers, such as those discussed above, in an aqueous fluid containing at least a trace amount of at least one divalent or multivalent cation. In some published processes, in order to hydrate the gelling polymer and make the cross-linked gel, a strong acid, such as HCl, can be added to the base fluid containing the gelling polymer. This mixture may be allowed to react for some length of time. The strong acid can reduce the pH to near zero and significantly promote polymer hydration, especially under shear. After polymer hydration, the pH of the polymer mixture can be increased to promote cross-linking of the gel.

However, it has been discovered that the strong acid used to promote polymer hydration of the gelling polymer at low pH can result in significant degradation of the polymer. For example, the low pH can result in the formation of a considerable amount of low molecular-weight gelling polymer. This can in turn reduce or eliminate the ability of the gel to cross-link and/or the resulting gel strength can be reduced. Further, when the polymers contact the subterranean formation, a low molecular-weight polymer can more easily move into the formation and cause undesired formation damage.

Furthermore, at the current cost of rig time, strong economic reasons, among others, exist to ensure that the cross-linkable polymer slurry can be fully, effectively and quickly hydrated, that the hydrated polymer can be fully, effectively and quickly cross-linked, and that the cross-linked polymer treating fluid can be fully, effectively and quickly delivered to the subterranean well or pipeline.

In addition, there are safety, regulatory and environmental concerns when working with strong acids, such as HCl. This can be especially true if the strong acid is used in combination with brines and/or for processing on an oil rig, especially offshore where space is limited and equipment for processing with strong acids may be unavailable or costly.

The present disclosure is directed to overcoming, or at least reducing the effects of, one or more of the problems set forth above.

SUMMARY

An embodiment of the present disclosure is directed to a method for forming a well and pipeline treating fluid. The method comprises combining a cross-linkable gelling polymer, a scavenging compound capable of reducing a concentration of divalent and polyvalent metal ions and salts thereof available for reaction, a hydration solvent and optionally an acid. The resulting mixture has a first viscosity and a pH ranging from about 3 to about 7. The mixture is maintained at conditions suitable for hydration of the cross-linkable gelling polymer until the mixture has a second viscosity that is greater than the first viscosity. The mixture is combined with an aqueous based fluid and at least one cross-linking agent. The pH of the mixture is raised to a sufficient level to allow a desired degree of cross-linking to occur.

Another embodiment of the present disclosure is directed to a well and pipeline treating gel. The well and pipeline treating gel comprises a cross-linkable gelling polymer, a scavenging compound capable of reducing a concentration of divalent and polyvalent metal ions and salts thereof available for reaction, a hydration solvent and optionally an acid. The resulting mixture has a pH ranging from about 3 to about 7.

Another embodiment of the present disclosure is directed to a method for forming a well and pipeline treating fluid. The method comprises combining a cross-linkable gelling polymer, a hydration solvent and optionally a scavenging compound capable of reducing a concentration of divalent and polyvalent metal ions and salts thereof available for reaction. The mixture has a first viscosity. The pH is maintained at a range of from about 3 to about 7 at conditions suitable for hydration of the cross-linkable gelling polymer until the mixture has a second viscosity that is greater than the first viscosity. The mixture is combined with an aqueous based fluid and at least one cross-linking agent.

Yet another embodiment of the present disclosure is directed to a well and pipeline treating fluid. The well and pipeline treating fluid is made by combining ingredients comprising a cross-linkable gelling polymer, a scavenger compound capable of reducing a concentration of divalent and polyvalent metal ions and salts thereof available for reaction, a hydration solvent, an aqueous based fluid and at least one cross-linking agent.

Still another embodiment of the present disclosure is directed to a method for treating a well or pipeline. The method comprises providing a treating fluid made by combining ingredients comprising a cross-linkable gelling polymer, a scavenging compound capable of reducing a concentration of divalent and polyvalent metal ions and salts thereof available for reaction, a hydration solvent, an aqueous based fluid and at least one cross-linking agent. The treating fluid is introduced into a well or pipeline.

DETAILED DESCRIPTION

A method for forming a well and pipeline treating fluid according to an embodiment of the present disclosure comprises combining a cross-linkable gelling polymer, a scavenging compound capable of reducing a concentration of divalent and polyvalent metal ions and salts thereof available for reaction, a hydration solvent and optionally an acid to form a mixture having a pH ranging from about 3 to about 7. The resulting mixture can be maintained at conditions suitable for hydration of the cross-linkable gelling polymer. After hydration occurs, which can result in an increased viscosity, the mixture can be combined with an aqueous based fluid and at least one cross-linking agent. The pH of the mixture can then be raised to about 7 or greater to allow a desired degree of cross-linking to occur.

The cross-linkable gelling polymers employed in the processes of the present disclosure contain one or more cross-linking moieties and can be hydrated in an aqueous based solvent. Examples of suitable gelling polymers include hydratable polysaccharides, such as, but not limited to, guars, which can include, for example, guar and guar derivatives, such as carboxymethyl hydroxypropyl guar, and celluloses, which include cellulose derivates as described herein. The cross-linking moieties can include, for example, phosphate groups, phosphonate groups, hydroxyl groups, amine groups and carboxyl groups. The cross-linkable gelling polymers of the present application are capable of cross-linking to form high-viscosity gels. In an embodiment, the hydratable polysaccharide is chosen from hydroxyalkyl carboxyalkyl guars and hydroxyalkyl carboxyalkyl celluloses Other examples of suitable celluloses include those cellulose derivatives disclosed in U.S. Patent No. Application Publication No. 2008/0026958, the disclosure of which is hereby incorporated by reference. These example cellulose derivatives are prepared by reacting allyl or vinyl monomers having a crosslinkable substituent, such as vicinal dihydroxy groups or a vinyl phosphonic acid, with a cellulose derivative using a redox or redox initiated system comprising ceric ions and nitric acid. The cellulose derivatives can be hydroxyalkyl cellulose having a hydroxyalkyl molar substitution from about 1.5 to about 3. "Molar substitution" as that term is used herein refers to the average number of moles of a substituent group present per anhydroglucose unit of the cellulose material. The alkyl group is selected from the group of ethyl, propyl, and mixtures thereof. In an embodiment, the hydroxyalkyl cellulose is hydroxyethyl cellulose (HEC) having a molar substitution in the range of about 1.8 to about 2.5.

The cellulose derivatives can be rendered crosslinkable by grafting certain allyl or vinyl monomers having vicinal dihydroxy groups or a vinyl phosphonic acid to the cellulose derivative. The monomers have a reactive moiety (e.g., $CH_2=C^-$) that is believed to enable the monomer to attach to a hydroxyl group of the cellulose derivative. The monomer may also provide a crosslinkable substituent, such as a vicinal hydroxy group or a phosphonate group, which enables the copolymer to crosslink upon solvation in the presence of a suitable cross-linking agent. Grafting monomers can include, but are not limited to, glyceryl allyl ether (GAE), 1,2-dihydroxypropylmethacrylate (DHPM), vinyl phosphonic acid (VPA), allyl glycidyl ether (AGE), and glycidyl methacrylate (GMA). Others may also be suitable. For cellulose derivatives comprising both AGE and GMA, the epoxide group must be hydrolyzed to render the polymer crosslinkable. In an embodiment, the grafting monomers are GMA and VPA.

The following patents are incorporated herein by reference with respect to suitable cellulose derivatives for use in the present invention: U.S. Pat. Nos. 5,122,549; 5,304,620; 5,067,565 and 4,982,793. These patents describe cross-linkable cellulose derivatives and processes by which cross linkable cellulose derivatives are prepared by grafting vinyl or allyl monomers having a cross linkable substituent onto the cellulose derivative. The resulting copolymers are non-ionic or ionic and crosslink readily with polyvalent metal ions and salts thereof or borate to form stable high-viscosity gels.

Additionally, in general, any of the water-soluble cellulose ethers can be used in the practice of the present disclosure. Those cellulose ethers which can be used include, among others, the various carboxyalkyl cellulose ethers, such as carboxyethyl cellulose and carboxymethyl cellulose (CMC); mixed ethers such as carboxyalkyl ethers, such as carboxymethyl hydroxyethyl cellulose (CMHEC); hydroxyalkyl celluloses such as hydroxyethyl cellulose (HEC) and hydroxypropyl cellulose; alkylhydroxyalkyl celluloses such as methylhydroxypropyl cellulose; alkyl celluloses such as methyl cellulose, ethyl cellulose and propyl cellulose; alkylcarboxyalkyl celluloses such as ethylcarboxymethyl cellulose; and alkylalkyl celluloses such as methylethyl cellulose; and hydroxyalkylalkyl celluloses such as hydroxypropylmethyl cellulose; and the like. A preferred derivatized cellulose is a hydroxyethyl cellulose grafted with vinyl phosphonic acid such as disclosed in U.S. Pat. No. 5,067,565

A commercially available cellulose derivative suitable for use in the methods of the present disclosure is available from the Special Products Division of Champion Technologies, Inc. in Houston, Tex. under the tradename SPECIAL PLUG.

In some embodiments, the cellulose derivatives used in the fluid loss control pills of the present invention may be prepared by reacting certain vinyl monomers having a crosslinkable substituent with a cellulose derivative using a redox or redox initiated free-radical system comprising the reaction product of a peroxide with a ferrous salt. This process is described in detail in U.S. Pat. No. 5,304,620, issued Apr. 19, 1994 to Marlin D. Holtmyer et al., the description of which is hereby incorporated by reference in its entirety.

The cross-linkable gelling polymers can be provided in any suitable form. In an embodiment, the gelling polymers can be provided as a slurry, which can comprise a solvent in which the gelling polymers are dispersed. In another embodiment, the gelling polymers can be provided in a substantially dry form, which can be completely dry or moist due to most or all of the solvent having been removed. The dry form may contain from zero to about 30 wt. % solvent. It is thought that the substantially dry form of the polymer may be easier to handle and use and give greater flexibility in formulating cross-linked gels when mixed with an aqueous base.

In an embodiment, the gelling polymer can be included in the mixture in any suitable amount. For example, the gelling polymer can be included in an amount that will result in a concentration in the final product (e.g., fluid loss pill, insulating fluid, pigging fluid, fracturing fluid, displacement fluid, hole plugging fluid) ranging from about 0.1% to about 10% by weight in the final product, more preferably in an amount of from about 0.15% to about 2%, and most preferably about 0.2% to about 1.2% by weight. As would be readily apparent to one of ordinary skill in the art, the concentration used can be determined by a number of factors, such as the specific gelling polymer employed and the particular type of final product being formulated (e.g., fluid loss pill, insulating fluid, displacement fluid, pigging fluid, fracturing fluid or hole plugging fluid).

A scavenging compound capable of reducing a concentration of multivalent metal ions and salts thereof that are potentially available for reaction in the mixture can be added to the compositions of the present disclosure. It is believed that some multi-valent metal ions and salts thereof may slow the rate of hydration by complexing with the phosphonate or other cross-linkable moieties thereby deactivating cross-linking sites or cross-linking the polymer to some degree. Such multivalent metal ions and salts thereof can include divalent and polyvalent metal ions and salts thereof, such as iron ions, copper ions, ceric ions, zirconium species ($Zr^{+4}$), titanium species ($Ti^{+4}$), zinc ions and/or calcium ions. One or more of these ions may be introduced in trace amounts, or greater concentrations, along with the other ingredients of the mixture. For example, cerium or iron can be employed as an element in the synthesis of the cross-linkable gelling polymer, and thus residual amounts of cerium or iron ions may be introduced therewith.

It is believed that reducing the availability of such metal ions and salts thereof can help to reduce the time it takes to effectively hydrate the cross-linkable copolymers of the present disclosure at a higher pH of about 3 or greater. Suitable compounds capable of reducing the concentrations of metal ions and salts thereof include sodium phosphate, sodium carbonate and other salts which are capable of reacting with the metal ions and salts thereof to form a precipitate. Complexing agents can also be employed, such as ethylenediaminetetraacetic acid (EDTA) and nitrilotriacetic acid (NTA) and their salts and other complexing agents which are capable of forming a complex with metal ions and salts thereof, thereby rendering them unavailable for reaction.

The hydration solvent used in the mixtures of the present disclosure may comprise fresh water, which can be from any source, such as tap water; brackish water, saltwater, or brines, or any other suitable aqueous based solvent. The hydration solvent can contain up to an amount of polyvalent metal ions and salts thereof controllable by precipitation, complexation or scavenging compound so as to allow for a desired degree of hydration in a desired amount of time.

The hydration solvent can optionally contain polyols such as ethylene glycol, propylene glycol, glycerol, polyglycols and polyglycerols, and other water miscible organic materials. Lower molecular weight polyols like ethylene glycol are good solvents to slurry and partially hydrate dry polymers, especially with trace water to make pre-slurries of polymer for use in various product formulations.

In an embodiment, the hydration solvent is fresh water. In another embodiment, the hydration solvent comprises an aqueous based solvent chosen from lithium chloride brine, lithium bromide brine, sodium chloride brine, sodium bromide brine, potassium chloride brine, potassium bromide brine, cesium chloride brine and cesium bromide brine. For purposes of the present application, fresh water is defined as water having a total dissolved salt concentration of from zero to less than 500 ppm; brackish water is defined as having a total dissolved salt concentration ranging from 500 ppm to less than 30 ppt; saltwater is defined as water having a total dissolved salt concentration ranging from 30 ppt to less than 50 ppt; and brine is defined as water having a total dissolved salt concentration of 50 ppt or more.

An acid can optionally be added to the mixture in order to adjust the pH to a range between about 3 to about 7. In an embodiment, the pH can range from about 3.2 to about 3.5. Any suitable acid can be employed. Because the pH can be relatively high (e.g., above 3), weak acids, such as acetic acid or citric acid can be used.

The mixture can be maintained at conditions that allow hydration to occur for any suitable amount of time, which can depend on, among other things, the particular ingredients of the mixture and the desired viscosity after hydration. The use of the scavenging compound capable of reducing a concentration of multivalent metal ions and salts thereof, such as EDTA or sodium phosphate, allows for hydration to occur in a relative short time at a pH of about 3 to 4 or greater. For example, in mixtures where EDTA or sodium phosphate are employed, hydration can potentially occur in about 1 hour to about 3 days, such as about 2 to about 24 hours. In an embodiment where little or no acid or scavenging compound is employed, and the pH ranges from, for example, about 6 to about 7, hydration may take several days to in some cases several months.

The viscosity at 3 rpm (Fann 35 type Rheometer) of the mixture increases as a result of hydration. For example, the viscosity of the mixture prior to hydration can range from about 1 Cp to about 300 Cp. Suitable viscosities after hydration can range from about 9,000 Cp to about 20,000 Cp or more.

After a suitable viscosity has developed, the hydrated mixture can be mixed with and cross-linked by a compound containing calcium, zirconium, titanium or other divalent or polyvalent metal ions and salts thereof or borates capable of cross-linking the polymer, or a desired amount of aqueous based fluid containing such cross-linking species, to form a cross-linked composition. For example, if the application is to be in the form of a pill, such as a fluid loss pill, the crosslinked composition can be mixed with a suitable amount of, for example, brine or other fluid, to form the pill composition.

The pH of the hydrated mixture or the cross-linked composition can be raised under suitable conditions to provide the desired degree of cross-linking or to adjust the final pH. This can be accomplished by adding a sufficient amount of an acid neutralizing agent to the composition to raise the pH to any value that will produce a desired degree of cross-linking, such as, for example, a pH of 4 or more. In an embodiment, the pH can range from about 4 to about 7. In another embodiment, the pH can range from greater than 7 to about 9. An additional cross-linking agent can also be included in the mixture to promote the desired cross-linking.

The aqueous based fluids combined with the hydrated mixtures of the present disclosure may comprise fresh water, brackish water, saltwater, or brine, or any other suitable aqueous based fluids. The aqueous based fluids can also contain polyols such as ethylene glycol, propylene glycol, glycerol, polyglycols and polyglycerols, and other water miscible organic materials. The aqueous based fluids can contain an amount of polyvalent metal ions and salts thereof necessary to cross-link the hydrated polymer, or the polyvalent metal ions and salts thereof necessary to cross-link the hydrated polymer can be added before or after the aqueous based fluid. In an embodiment, suitable brines can include calcium chloride, calcium bromide, zinc chloride, zinc bromide, potassium chloride, sodium chloride, lithium chloride, cesium chloride, potassium bromide, sodium bromide, lithium bromide and cesium bromide, and mixtures thereof. Generally, the aqueous based fluids may be from any source, provided that it does not contain concentrations of detrimental components that might adversely affect the stability and/or performance of the resulting product.

In certain embodiments, aqueous based fluid can be chosen to provide a desired density for the cross-linked composition. For example, the density of the aqueous base fluids can be adjusted to either match the density of a fluid in the wellbore or make sure that the cross-linked composition stays in a certain place within a wellbore. For example, in some instances, it may be desirable to make a fluid loss control pill (a mixture of cross-linked composition and completion brine fluid, typically 0 to 60% brine) of the present disclosure heavier than other fluids. In other instances, it may be desirable to maintain the fluid loss control pill within a certain location within a wellbore, and therefore, have its density be such that it does not fall beneath that desired location or rise above that location. Selecting appropriate aqueous based fluids is well within the ordinary skill of the art.

Any acid neutralizing agent that is suitable for raising the pH of the solution to the desired level so that a desired degree of cross-linking can occur can potentially be used. Examples of suitable neutralizing agents include NaOH, KOH, sodium bicarbonate, $HCO_3^-$, $CO_3^{2-}$, $OH^-$, basic amine compounds such as monoethanol amine, diethanol amine, triethanol amine and amine ethers, $Ca(OH)_2$, CaO and MgO, and mixtures thereof. Some of the compounds, such as $Ca(OH)_2$, CaO and MgO, can potentially be employed both as the cross-linking agent and to neutralize the acid.

Any suitable cross-linking agent can be employed. Suitable cross-linking agents can include, for example, divalent ions, such as $Ca^{2+}$, $Mg^{2+}$, $Fe^{2+}$, $Zn^{2+}$, $ZrO^{2+}$, $TiO^{2+}$ and salts thereof; trivalent ions, such as $Al^{3+}$, $Fe^{3+}$ and salts thereof; borates, titanates and zirconates, such as $Ti(OC_3H_6)_4$, sodium titanium lactate, $Zr(OC_3H_6)_4$ and sodium zirconium lactate. In embodiments where calcium chloride and/or calcium bromide are employed as the aqueous based fluid, the calcium ions from the brine can act as cross-linking agents in the mixture.

The aqueous based fluid, acid neutralizing agent and cross-linking agent can be added in any suitable order at any desired time after hydration. For example, the entire process, including hydrating the gelling polymer and mixing the aqueous based fluid, acid neutralizing agent and cross-linking agent can be performed in a batch or continuous process at a single chemical plant or other chemical processing facility. In alternative embodiments, portions of the process can be carried out at a plant to form a premix that can then be transported to the field, where the final product is formulated. For example, a premix of the hydrated gel can be formulated at the plant and then transported to a well rig where cross-linking is carried out and the other desired ingredients are added to form the final product.

In yet another embodiment, the entire process can be carried out in the field. One advantage of the present application is that the use of strong acids in the process can be reduced or eliminated altogether while maintaining the ability to hydrate relatively quickly, which can make hydrating at the rig a more feasible option due to the health, safety and environmental issues of dealing with strong acids in the field. Hydration at the rig can potentially allow additional ingredients, such as internal breakers, to be more uniformly dispersed throughout the mixture during hydration, which can be advantageous compared to premixes that are gelled and/or cross-linked at the plant and then later mixed with a working fluid in the field. In addition, mixing breakers at the rig increases the number of different types of breakers that can be employed when compared to pre-mixing breakers at the plant. This is because the pre-mix may be stored for months before use, so any breakers added at the plant must meet the additional criteria of not being active at storage temperatures to avoid breaking the mixture during storage. Thus, the ability to perform the hydration step at the rig can be advantageous for one or more of the reasons discussed above. Depending on pH, density and brine system, many commonly used breakers can be used, such as peroxides, perborates, bromates, enzymes, and encapsulated or delayed breakers.

The fluid loss control pills of the present invention optionally may comprise one or more additional additives known in the art, including, but not limited to, fluid loss control additives, gel stabilizers, gas (e.g., carbon dioxide or nitrogen), salts (e.g., KCl), pH-adjusting agents (e.g., buffers), corrosion inhibitors, dispersants, flocculants, acids, foaming agents, antifoaming agents, $H_2S$ scavengers, lubricants, oxygen scavengers, weighting agents, scale inhibitors, paraffin inhibitors, asphaltene inhibitors, surfactants, catalysts, clay control agents, biocides, friction reducers, particulates, oil soluble particulates, water soluble particulates, demulsifiers, nonemulsifiers, solvents, mutual solvents, paraffins, asphaltenes, hydrate inhibitors, derivatives thereof, and combinations thereof, provided that the additive(s) does not adversely impact stability and/or performance.

The present disclosure is also directed to well and pipeline treating gels. These gels can be employed as, for example, premixes to form well and pipeline treating fluids of the present disclosure. The gels can include ingredients described herein for making the gels of the treating fluids, including cross-linkable gelling polymers, scavenging compounds capable of reducing a concentration of divalent and polyvalent metal ions and salts thereof available for reaction, hydration solvents and optionally acids to form a mixture having a pH ranging from about 3 to about 7.

The present disclosure is also directed to methods for forming well and pipeline treating fluids. The method comprises: combining a cross-linkable gelling polymer, a hydration solvent and optionally a scavenging compound capable of reducing a concentration of divalent and polyvalent metal ions and salts thereof available for reaction, the mixture having a first viscosity. The pH of the mixture can be maintained at a range of from about 3 to about 7, such as a pH of about 4, 5 or 6, at conditions suitable for hydration of the cross-linkable gelling polymer until the mixture has a desired second viscosity that is greater than the first viscosity. The mixture can be combined with an aqueous based fluid and at least one cross-linking agent. Any of the cross-linkable gelling polymers, hydration solvents, scavenging compounds, aqueous based fluids and cross-linking agents discussed in the present disclosure can be used in this method.

The present disclosure is also directed to well and pipeline treating fluids, including pigging and insulating pipeline treating fluids, and displacement, fluid loss control, plugging, fracturing, and insulating well treating fluids made by the methods of the present application. The fluids can be made by combining ingredients comprising a cross-linkable gelling polymer, a scavenging compound capable of reducing a concentration of divalent and polyvalent metal ions and salts thereof available for reaction, a hydration solvent, an aqueous based fluid and at least one cross-linking agent using techniques similar to those discussed above. Any of the cross-linkable gelling polymers, hydration solvents, scavenging compounds, aqueous based fluids and cross-linking agents discussed in the present disclosure can be used to make these well treating fluids. Acids and pH adjusting agents can also be employed, as well as any of the other ingredients discussed herein.

The present disclosure is also directed to a method for treating a well or pipeline, such as a pipeline for hydrocarbons, or an injection well or a subterranean hydrocarbon producing well. The method comprises providing a treating fluid made by combining ingredients comprising a cross-linkable gelling polymer, a scavenging compound capable of reducing a concentration of divalent and polyvalent metal ions and salts thereof available for reaction, a hydration solvent, an aqueous based fluid and at least one cross-linking agent; and introducing the treating fluid into the well or pipeline. Any of the cross-linkable gelling polymers, hydration solvents, compounds capable of reducing a concentration of divalent and polyvalent metal ions and salts thereof available for reaction, aqueous based fluids and cross-linking agents discussed in the present disclosure can be used to make the well and pipeline treating fluids used in this treating method. Acids and pH adjusting agents can also be employed, as well as any of the other ingredients as discussed herein. The treating fluid can be a fluid loss control pill, an insulating fluid, a pigging fluid, a fracturing fluid, a displacement fluid or a hole plugging fluid.

The following examples are based on the cross-linkable gelling polymer being hydroxyethyl cellulose grafted with vinyl phosphonic acid and illustrate the practice of the present invention. This particular cross-linkable gelling polymer was prepared as a slurry in a non-aqueous polyol solvent at 30 wt. %. Because of the viscous nature of the final products, pH measurements, when reported, were made with colorpHast® pH 0 to 14 4-color pH-indicator strips available from EMD Chemicals Inc., Gibbstown, N.J. For each case, the materials were weighed to at least the nearest 0.1 gram or dispensed by volume to at least the nearest 0.1 milliliter. The rheology measurements were taken with a Fann Model 35 Viscometer using an R1B1 configuration.

EXAMPLES

Example 1

This Example illustrates the effectiveness of a scavenging compound on the rate of hydration for the cross-linkable gelling polymer when no acid was used during polymer hydration.

TABLE 1

| Sample | FH-0 | FH-11 |
|---|---|---|
| Cross-linkable gelling polymer, gram | 15 | 15 |
| Water, gram | 180 | 180 |
| Acid, milli-liter | 0 | 0 |
| Scavenger Compound, Di-Sodium EDTA, milli-gram | 0 | 100 |

| Fann RPM | Fann Dial Reading | |
|---|---|---|
| 3 | 4 | 23 |
| 6 | 6 | 38 |
| 100 | 52 | 185 |
| 200 | 89 | >300 |

Two samples were prepared according to the prescription outlined in Table 1. In each case, the amount of cross-linkable polymer slurry was added to the amount of water and stirred for about 2 minutes. The scavenger compound di-sodium EDTA was added to Sample FH-11. Both samples were stirred for one hour, at which time rheology measurements were made. Results are presented in lower section of Table 1. The higher the Fann Dial Readings shown in the Tables, the higher the viscosity at a given RPM. Thus, the results in Table 1 show that the Fann Dial Reading, and thus the viscosity, is significantly higher for the FH-11 composition that includes the scavenger compound for each of the RPM values tested.

Example 2

This Example illustrates the effectiveness of a scavenger compound on the rate of hydration for the cross-linkable gelling polymer in the presence of a weak acid during hydration.

Two samples were prepared according to the prescription outlined in Table 2. In each case, the amount of cross-linkable polymer slurry was added to the amount of water and stirred for about 2 minutes, at which time an amount of the scavenger compound di-sodium EDTA was added to Sample FH-10. An identical amount of acetic acid was then added to both samples. Both samples were stirred for one hour and then rheology measurements were made. Results are presented in lower section of Table 2. The results in Table 2 show that the Fann Dial Reading, and thus the viscosity, is significantly higher for the FH-10 composition that includes the scavenger compound for each of the RPM values tested.

TABLE 2

| Sample | FH-12 | FH-10 |
|---|---|---|
| Cross-linkable gelling polymer, gram | 15 | 15 |
| Water, gram | 180 | 180 |
| Acetic acid, milli-liter | 1 | 1 |
| Scavenger Compound, Di-Sodium EDTA, milli-gram | 0 | 100 |

TABLE 2-continued

| Fann RPM | Fann Dial Reading | |
|---|---|---|
| 3 | 20 | 115 |
| 6 | 34 | 158 |
| 100 | 180 | >300 |
| 200 | 245 | >300 |

Example 3

This Example illustrates the effectiveness of different amounts of a scavenger compound on the rate of hydration for the cross-linkable gelling polymer in the presence of a weak acid during hydration.

Sample FH-4 was prepared according to the prescription outlined in Table 3. The amount of cross-linkable polymer slurry was added to the amount of water and stirred for about 2 minutes, at which time the amount of scavenger compound, di-sodium EDTA, was added. As shown in Table 3, less scavenger compound was added to the Sample FH-4 than was added to FH-10. The same amount of acetic acid was added to both samples. The samples were stirred one hour before rheology data was obtained. The results are shown in Table 3. The results in Table 3 show that the Fann Dial Reading, and thus the viscosity, is higher for the FH-10 composition at the lower RPMs.

TABLE 3

| Sample | FH-4 | FH-10 |
|---|---|---|
| Cross-linkable gelling polymer, gram | 15 | 15 |
| Water, gram | 180 | 180 |
| Acetic acid, milli-liter | 1 | 1 |
| Scavenger Compound, Di-Sodium EDTA, milli-gram | 54 | 100 |
| Fann RPM | Fann Dial Reading | |
| 3 | 105 | 115 |
| 6 | 142 | 158 |
| 100 | >300 | >300 |
| 200 | >300 | >300 |

Example 4

This Example illustrates the effectiveness of a scavenger compound on the rate of hydration for the cross-linkable gelling polymer for sodium bromide brine with and without the presence of a weak acid during hydration.

Samples NB-1 to NB-4 were prepared according to the prescription outlined in Table 4. The amount of cross-linkable polymer slurry was added to the

TABLE 4

| Sample | NB-1 | NB-2 | NB-3 | NB-4 |
|---|---|---|---|---|
| Cross-linkable gelling polymer, gram | 15 | 15 | 15 | 15 |
| 12.5 ppg NaBr, milli-liter | 180 | 180 | 180 | 180 |
| Acetic acid, milli-liter | 0 | 1 | 0 | 1 |
| Scavenger Compound, Di-Sodium EDTA, milli-gram | 0 | 0 | 100 | 100 |

TABLE 4-continued

| Fann RPM | Fann Dial Reading | | | |
|---|---|---|---|---|
| Stirred One Hour | | | | |
| 3 | 2 | 2 | 4 | 5 |
| 6 | 3 | 3 | 7 | 10 |
| 100 | 31 | 31 | 66 | 77 |
| 200 | 50 | 51 | 90 | 105 |
| Static One Hour | | | | |
| 3 | 3 | 12 | 12 | 12 |
| 6 | 7 | 22 | 22 | 22 |
| 100 | 62 | 130 | 133 | 150 |
| 200 | 82 | 181 | 178 | 205 |
| Static Five Hour | | | | |
| 3 | 35 | 50 | 82 | 142 |
| 6 | 55 | 81 | 120 | 210 |
| 100 | 264 | >300 | >300 | >300 |
| 200 | >300 | >300 | >300 | >300 | amount of 12.5 ppg sodium bromide brine and stirred for about 2 minutes. To Samples NB-3 and NB-4, the amount of the scavenger compound di-sodium EDTA was added. Then the amount of acetic acid was added to Samples NB-2 and NB-4, and all samples were stirred one hour before rheology data was obtained. Results are presented in Table 4. All samples were allowed to hydrate statically for additional time. Rheology data for statically hydrated polymer are also presented in Table 4. The results in Table 4 show that the composition labeled NB-4 had increased Fann Dial Readings, and thus increased viscosity, at each tested RPM after stirring for 1 hour and after allowing to set static for 1 hour. After 5 hours of setting static, both the low RPM tests also showed increased viscosity for the NB-4 composition compared to the other compositions.

Example 5

This Example illustrates the impact strong acid has on the effectiveness of the well and pipeline treating fluid when used for subterranean fluid loss control.

Samples A to D were prepared according to the prescription outlined in Table 5. The order of addition and formulation for each sample are clearly specified below. The same amount of cross-linkable polymer slurry was added to the same amount of water for each sample and stirred for about 10 minutes.

To Sample A, the specified amount of 14.2 ppg $CaBr_2$ was added, stirred for 3 minutes, and held static for about 15 minutes. To fully hydrate the cross-linkable polymer, the pH of the slurry was adjusted to about zero by the addition of 1.30 grams concentrated HCl acid (31.5% HCl). As the polymer rapidly hydrated and the viscosity rapidly escalated, the mixture was stirred for 3 minutes. The acid was neutralized by the addition of 1.2 gram MgO and the final pH was measured to be 7 to 8. Fluid loss data is reported in Table 5.

Sample B was kept static for 4 days as the cross-linkable polymer was allowed to hydrate. A portion of the 14.2 ppg $CaBr_2$ (170.0 grams) was then added, stirred for 5 minutes and held static for 10 minutes. The MgO was added and the mixture

TABLE 5

| Sample | C | A | B | D |
|---|---|---|---|---|
| Water, gram | 216.6 | 216.6 | 216.6 | 216.6 |
| Cross-linkable gelling polymer, gram | 20 | 20 | 20 | 20 |
| 14.2 CaBr2, gram | 319.5 | 319.5 | 319.5 | 319.5 |
| HCl (31.5%), gram | 3.9 | 1.3 | — | — |
| MgO, gram | 1.2 | 1.2 | 1.2 | — |
| NaHCO3, gram | — | — | — | 2.0 |
| water, gram | — | — | — | 4.0 |
| Cumulative Fluid Loss Data Milli-Liter at 70° F. Through a 3 Darcy Aloxite ® Disk | | | | |
| 200 psi/5 minutes | 0 | 0 | 0 | 0 |
| 500 psi/5 minutes | 3.3 | 0 | 0 | 0 |
| 800 psi/5 minutes | 10.8 | 2.5 | 0 | 0 | was stirred for 3 minutes, followed by the addition of 149.5 grams of 14.2 ppg $CaBr_2$. The final pH was measured to be 6.5 to 7.5. Fluid loss data is reported in Table 5.

The pH of Sample C was adjusted to less than zero by the addition of 3.9 gram of concentrated HCl acid (31.5% HCl) to allow hydration of the cross-linkable polymer, and the mixture was stirred for 3 minutes. A portion of the 14.2 ppg $CaBr_2$ (160.0 grams) was added, stirred for 3 minutes, and kept static for 15 minutes. The amount of MgO was added, stirred for 3 minutes, and was followed by 159.5 grams of 14.2 ppg $CaBr_2$. The final pH was measured to be about 7.5. Fluid loss data is reported in Table 5. It should be noted that the lost fluid was a mixture of brine and polymer.

Sample D was kept static for 4 days as the cross-linkable polymer was allowed to hydrate. The amount of 14.2 ppg $CaBr_2$ (319.5 grams) was added, stirred for 5 minutes and kept static for 10 minutes. The pH of the final solution was adjusted from about 6.5 to 7.5-8.0 by the addition of 2.0 gram sodium bicarbonate in 4.0 gram water. Fluid loss data is reported in Table 5. As seen from Table 5, the compositions that contained a strong acid, HCl, experienced fluid loss, while the other compositions did not.

Example 6

This Example illustrates the versatility of the hydration methods when applied to the preparation of different formulations useful in well and pipeline applications.

TABLE 6

| Sample | E | F |
|---|---|---|
| Water, gram | 180.0 | 59.1 |
| Cross-linkable gelling polymer, gram | 15.0 | 15.0 |
| Scavenger Compound, di-sodium EDTA gram | 0.10 | 0.10 |
| Acetic Acid, milli-liter | 1.0 | 1.0 |
| Water, gram | 45.8 | — |
| 14.2 ppg $CaBr_2$, gram | 305.8 | 265.5 |
| 19.2 ppg $ZnBr_2/CaBr_2$, gram | — | 437.8 |
| Supplemental cross-linking agent, gram | — | 4.0 |
| MgO, gram | — | 1.2 |
| NaHCO3, gram | 2.0 | — |
| Water, gram | 6.0 | — |

Sample E was prepared according to the prescription outlined in Table 6. While stirring, the amount of cross-linkable polymer slurry was added to the amount of water and stirred for 3 minutes. Then the amount of scavenger compound di-sodium EDTA was added and stirred for 3 minutes, followed by the amount of acetic acid and stirring for an additional 3 minutes. This mixture was kept static for 2 hours; the pH was about 3. A second amount of water was added and the mixture was stirred for 3 minutes. The amount of 14.2 ppg $CaBr_2$, was added and the mixture was stirred for about 30 minutes. Sodium bicarbonate in water was then added to adjust the pH to more than 6. A good quality cross-linked gel resulted in about an hour.

Sample F was prepared according to the prescription outlined in Table 6. The amount of cross-linkable polymer slurry was added to the amount of water and stirred for 3 minutes. Next, the amount of scavenger compound di-sodium EDTA was added and the mixture was again stirred for 3 minutes. The amount of acetic acid was then added and the mixture was stirred for 3 minutes. The mixture was kept static for 2 hours. The amount of 14.2 ppg $CaBr_2$ was added to the resulting thick paste, stirred for 15 minutes and kept static for 15 minutes. Next, the amount of 19.2 ppg $ZnBr_2/CaBr_2$ was added in 1 minute and stirred for 5 minutes. The supplemental cross-linking agent was added as a dilute solution (4.00 gram sodium zirconium lactate solution; less than 0.2 gram zirconium) and stirred 3 minutes. The pH was then adjusted by the addition of 1.20 grams MgO. The mixture was stirred for 1 minute and then kept static for 30 minutes. A good quality cross-linked gel formed during the 30 minutes.

Although various embodiments have been shown and described, the disclosure is not so limited and will be understood to include all such modifications and variations as would be apparent to one skilled in the art.

What is claimed is:

1. A method for forming a well and pipeline treating fluid, the method comprising:
   combining a cross-linkable gelling polymer, a scavenging compound capable of reducing a concentration of divalent and polyvalent metal ions and salts thereof available for reaction, and a hydration solvent and forming a mixture having a pH ranging from about 4 to about 7, the mixture having a first viscosity and including an acid, the scavenging compound being at least one compound chosen from sodium phosphate, sodium carbonate, nitrilotriacetic acid and its salts and di-sodium ethylenediaminetetraacetic acid and its salts, and the acid being acetic acid and/or citric acid;
   maintaining the mixture at conditions suitable for hydration of the cross-linkable gelling polymer until the mixture has a second viscosity that is greater than the first viscosity;
   after reaching the second viscosity, combining the mixture with an aqueous based fluid and at least one cross-linking agent; and
   after reaching the second viscosity, raising the pH of the mixture to a sufficient level to allow a desired degree of cross-linking to occur.

2. The method of claim 1, wherein the cross-linkable gelling polymer is a hydratable polysaccharide comprising cross-linking moieties.

3. The method of claim 2, wherein the hydratable polysaccharide is chosen from guars and celluloses.

4. The method of claim 2, wherein the hydratable polysaccharide is chosen from hydroxyalkyl carboxyalkyl guars and hydroxyalkyl carboxyalkyl celluloses.

5. The method of claim 2, wherein the cross-linking moieties comprise at least one group chosen from phosphate groups, hydroxyl groups, amine groups and carboxyl groups.

6. The method of claim 1, wherein the cross-linkable gelling polymer is chosen from celluloses reacted with one or more grafting monomers.

7. The method of claim 6, wherein the grafting monomers are chosen from glyceryl allyl ether (GAE), 1,2-dihydroxypropylmethacrylate (DHPM), allyl glycidyl ether (AGE), and glycidyl methacrylate (GMA).

8. The method of claim 6, wherein the celluloses are chosen from cellulose ethers, hydroxyalkyl celluloses, alkylhydroxyalkyl celluloses, alkyl celluloses, alkylcarboxyalkyl celluloses, alkylalkyl celluloses, and hydroxyalkylalkyl celluloses.

9. The method of claim 6, wherein the cross-linkable gelling polymer is hydroxyethyl cellulose grafted with vinyl phosphonic acid.

10. The method of claim 1, wherein the cross-linkable gelling polymer is a slurry.

11. The method of claim 1, wherein the cross-linkable gelling polymer is in a substantially dry form containing from about 0 to about 30 wt. % solvent.

12. The method of claim 1, wherein the scavenging compound is at least one compound chosen from sodium phosphate, sodium carbonate, and nitrilotriacetic acid and its salts.

13. The method of claim 1, wherein the hydration solvent comprises an aqueous based solvent chosen from fresh water, brackish water and saltwater.

14. The method of claim 13, wherein the hydration solvent further comprises at least one polyol.

15. The method of claim 1, wherein the hydration solvent is an aqueous based solvent chosen from brine and mixtures of brine with fresh water or saltwater.

16. The method of claim 1, wherein the hydration solvent comprises an aqueous based solvent chosen from lithium chloride brine, lithium bromide brine, sodium chloride brine, sodium bromide brine, potassium chloride brine, potassium bromide brine, cesium chloride brine and cesium bromide brine.

17. The method of claim 1, wherein the acid is employed to form the mixture having a pH ranging from about 4 to about 5.

18. The method of claim 1, wherein the acid is acetic acid.

19. The method of claim 1, wherein the acid is citric acid.

20. The method of claim 1, wherein the aqueous based fluid is a brine.

21. The method of claim 20, wherein the brine comprises at least one of calcium chloride, calcium bromide, zinc chloride, zinc bromide, potassium chloride, sodium chloride, lithium chloride, cesium chloride, potassium bromide, sodium bromide, lithium bromide and cesium bromide.

22. The method of claim 20, wherein the aqueous based fluid further comprises at least one polyol.

23. The method of claim 1, wherein after raising the pH, the pH is greater than 7 but less than or equal to about 9.

24. The method of claim 1, wherein after raising the pH, the pH ranges from greater than 4 to about 9.

25. The method of claim 1, wherein the pH is raised by using at least one neutralizing agent chosen from NaOH, KOH, sodium bicarbonate, $HCO_3^-$, $CO_3^{2-}$, $OH^-$, basic amine compounds, $Ca(OH)^2$, CaO and MgO.

26. The method of claim 25, wherein the neutralizing agent is a basic amine chosen from monoethanol amine, diethanol amine, triethanol amine and amine ethers.

27. The method of claim 25, wherein the neutralizing agent comprises at least one compound chosen from MgO, CaO, $Ca(OH)_2$, KOH and NaOH.

28. The method of claim 1, wherein the cross-linking agents comprise at least one of divalent ions and salts thereof, trivalent ions and salts thereof, borates, titanates and zirconates.

29. The method of claim 28 wherein the crosslinking agent is chosen from $Ti(OC_3H_6)_4$ and sodium titanium lactate.

30. The method of claim 28, wherein the crosslinking agent is chosen from $Zr(OC_3H_6)_4$ and sodium zirconium lactate.

31. The method of claim 1, further comprising adding one or more additional ingredients chosen from fluid loss control additives, gel stabilizers, gas, salts, pH-adjusting agents, corrosion inhibitors, dispersants, flocculants, acids, foaming agents, antifoaming agents, $H_2S$ scavengers, lubricants, oxygen scavengers, weighting agents, scale inhibitors, paraffin inhibitors, asphaltene inhibitors, surfactants, catalysts, clay control agents, biocides, friction reducers, particulates, oil soluble particulates, water soluble particulates, demulsifiers, nonemulsifiers, solvents, mutual solvents, paraffins, asphaltenes, and hydrate inhibitors.

32. The method of claim 1, wherein the well or pipeline treating fluid is a hydrocarbon pipeline treating fluid.

33. The method of claim 1, wherein the well or pipeline treating fluid is a hydrocarbon production well treating fluid or an injection well treating fluid.

34. A well and pipeline treating gel comprising a hydrated cross-linkable gelling polymer in a substantially uncrosslinked state, a scavenging compound capable of reducing a concentration of divalent and polyvalent metal ions and salts thereof available for reaction, and a hydration solvent including an aqueous based solvent chosen from fresh water, brackish water, saltwater, brine, and mixtures of brine with fresh water or saltwater to form a mixture having a pH ranging from about 4 to about 5, the mixture including an acid, the scavenging compound being at least one compound chosen from sodium phosphate, sodium carbonate, nitrilotriacetic acid and its salts and di-sodium ethylenediaminetetraacetic acid and its salts, and the acid being acetic acid and/or citric acid.

35. The gel of claim 34, wherein the cross-linkable gelling polymer is a hydratable polysaccharide comprising cross-linking moieties.

36. The gel of claim 34, wherein the cross-linkable gelling polymer is chosen from celluloses reacted with one or more grafting monomers.

37. The gel of claim 36, wherein the grafting monomers are chosen from glyceryl allyl ether (GAE), 1,2-dihydroxypropylmethacrylate (DHPM), allyl glycidyl ether (AGE), and glycidyl methacrylate (GMA).

38. The gel of claim 36, wherein the celluloses are chosen from cellulose ethers, hydroxyalkyl celluloses, alkylhydroxyalkyl celluloses, alkyl celluloses, alkylcarboxyalkyl celluloses, alkylalkyl celluloses, and hydroxyalkylalkyl celluloses.

39. The gel of claim 34, wherein the scavenging compound is at least one compound chosen from sodium phosphate, sodium carbonate, and nitrilotriacetic acid and its salts.

40. The gel of claim 34, wherein the acid is acetic acid.

41. A method for forming a well and pipeline treating fluid, the method comprising:
combining a cross-linkable gelling polymer, a hydration solvent and a scavenging compound capable of reducing a concentration of divalent and polyvalent metal ions and salts thereof available for reaction, the mixture having a first viscosity and the scavenging compound being at least one compound chosen from sodium phosphate, sodium carbonate, nitrilotriacetic acid and its salts and di-sodium ethylenediaminetetraacetic acid and its salts;
maintaining a pH ranging from about 4 to about 7 at conditions suitable for hydration of the cross-linkable gelling polymer until the mixture has a second viscosity that is greater than the first viscosity; and after reaching the second viscosity, combining the mixture with an aqueous based fluid and at least one cross-linking agent.

42. The method of claim 41, wherein the cross-linkable gelling polymer is a hydratable polysaccharide comprising cross-linking moieties.

43. The method of claim 41, wherein the cross-linkable gelling polymer is chosen from celluloses reacted with one or more grafting monomers.

44. The method of claim 43, wherein the grafting monomers are chosen from glyceryl allyl ether (GAE), 1,2-dihydroxypropylmethacrylate (DHPM), allyl glycidyl ether (AGE), and glycidyl methacrylate (GMA).

45. The method of claim 43, wherein the celluloses are chosen from cellulose ethers, hydroxyalkyl celluloses, alkylhydroxyalkyl celluloses, alkyl celluloses, alkylcarboxyalkyl celluloses, alkylalkyl celluloses, and hydroxyalkylalkyl celluloses.

46. The method of claim 41, wherein the scavenging compound is employed before the combining step with the aqueous based fluid and cross-linking agent, the scavenging compound being at least one compound chosen from sodium phosphate, sodium carbonate, and nitrilotriacetic acid and its salts.

47. A method for forming a well and pipeline treating fluid, the method comprising:
   combining a cross-linkable gelling polymer, a scavenging compound capable of reducing a concentration of divalent and polyvalent metal ions and salts thereof available for reaction, and a hydration solvent and forming a mixture having a pH ranging from about 4 to about 5, the mixture having a first viscosity and including an acid, the cross-linkable gelling polymer being chosen from celluloses reacted with one or more grafting monomers chosen from glyceryl allyl ether (GAE), 1,2-dihydroxypropylmethacrylate (DHPM), allyl glycidyl ether (AGE), and glycidyl methacrylate (GMA), the scavenging compound being at least one compound chosen from sodium phosphate, sodium carbonate, and nitrilotriacetic acid and its salts, and the acid being acetic acid;
   maintaining the mixture at conditions suitable for hydration of the cross-linkable gelling polymer until the mixture has a second viscosity that is greater than the first viscosity;
   combining the mixture with an aqueous based fluid and at least one cross-linking agent; and
   raising the pH of the mixture to a sufficient level to allow a desired degree of cross-linking to occur.

48. The method of claim 47, wherein the combination of the mixture with the aqueous based fluid and the at least one cross-linking agent occurs after reaching the second viscosity.

49. The method of claim 41, wherein the pH ranges from about 4 to about 5.

50. The method of claim 1, wherein the at least one cross-linking agent comprises a metal cross-linking agent.

\* \* \* \* \*